(12) United States Patent
Delaney

(10) Patent No.: US 10,977,623 B2
(45) Date of Patent: Apr. 13, 2021

(54) CHAT SESSION COMMUNICATION FOR TRANSACTIONS BETWEEN CHAT BOT APPLICATIONS

(71) Applicant: PAYPAL, INC., San Jose, CA (US)

(72) Inventor: Jennifer Esmeralda Delaney, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 520 days.

(21) Appl. No.: 15/706,296

(22) Filed: Sep. 15, 2017

(65) Prior Publication Data
US 2019/0087791 A1 Mar. 21, 2019

(51) Int. Cl.
| | | |
|---|---|---|
| *G06Q 20/02* | (2012.01) | |
| *H04L 12/58* | (2006.01) | |
| *G06Q 20/10* | (2012.01) | |
| *G06Q 20/40* | (2012.01) | |
| *G06Q 20/32* | (2012.01) | |

(52) U.S. Cl.
CPC ............ *G06Q 20/02* (2013.01); *G06Q 20/10* (2013.01); *G06Q 20/32* (2013.01); *G06Q 20/4014* (2013.01); *H04L 51/02* (2013.01)

(58) Field of Classification Search
CPC ........ G06Q 20/10; G06Q 20/02; G06Q 20/32; G06Q 20/4014; H04L 51/02
USPC .......................................................... 705/44
See application file for complete search history.

(56) References Cited

U.S. PATENT DOCUMENTS

| | | | |
|---|---|---|---|
| 2003/0126094 A1* | 7/2003 | Fisher | G06Q 20/02 705/75 |
| 2007/0208816 A1* | 9/2007 | Baldwin | G06Q 10/107 709/206 |
| 2014/0279050 A1 | 9/2014 | Makar et al. | |
| 2015/0371173 A1 | 12/2015 | Jalali | |
| 2017/0048170 A1 | 2/2017 | Smullen et al. | |
| 2017/0180284 A1 | 6/2017 | Smullen et al. | |
| 2017/0180485 A1* | 6/2017 | Lawson | G06Q 30/016 |

OTHER PUBLICATIONS

Bayu Setiaji and Ferry Wahyu Wibowo, "Chatbot Using a Knowledge in Database, Human-to-Machine conversation Modelling", 2016 7th International Conference on Intelligent Systems, Modelling and Simulation, 2016 IEEE, pp. 72-77.

Steven Gianvecchio, Mengjun Xie, Zhenyu Wu and Haining Wang, "Humans and Bots in Internet Chat: Measurement, Analysis, and Automated Classificatio1571n", IEEE/ACM Transactions on Networking, vol. 19, No. 5, Oct. 2011, pp. 1557-1571.

(Continued)

*Primary Examiner* — Lindsay M Maguire
(74) *Attorney, Agent, or Firm* — Haynes and Boone, LLP

(57) ABSTRACT

A payment chat bot can access a first chat text provided in a chat session by a merchant chat bot. The chat session is hosted by a chat service for communication between a plurality of chat application instances, where the payment and merchant chat bots simulate chat application instances. The method includes determining, based on the first chat text, whether to couple a payment session between a payment server and a merchant server for processing a payment transaction initiated from a chat application instance via the chat session. The method includes, in response to a determination to couple the payment session, coupling the payment session between the payment server and the merchant server.

20 Claims, 6 Drawing Sheets

(56) References Cited

OTHER PUBLICATIONS

Miss. Snehal S Deshmukh, "Classification of Human and Chat Bot for Server Side Security", International Journal of Computer Science and information Technology, vol. 3, Issue 2, pp. 427-431, Month: Apr.-Jun. 2015.

Sameera A. Abdul-Kader and Dr. John Woods, "Survey on Chatbot Design Techniques in Speech conversation Systems", (IJACSA) International Journal of Advanced Computer Science and Applications, vol. 6, No. 7, 2015, pp. 72-80.

* cited by examiner

CHAT SESSION COMMUNICATION FOR TRANSACTIONS BETWEEN CHAT BOT APPLICATIONS

BACKGROUND

Embodiments of the inventive subject matter generally relate to the field of communication systems and, more particularly, to communicating in chat sessions using chat bots.

Chat sessions facilitate communication between chat applications in a communication system. A user of a chat application can communicate, over a communication network, with a user of another chat application by transmitting communication to, and receiving communication from, the chat session. A chat bot can simulate a chat application to communicate with other chat applications using the chat session. The user can also have an account at a financial institution. However, the user cannot easily access his or her financial accounts from the chat session, such as to initiate and process transactions with merchant servers. For example, the user may not be able to easily conduct a transaction with a merchant from the chat session. If access to own financial account is tedious and overly complicated, that may discourage the user from using the chat session.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
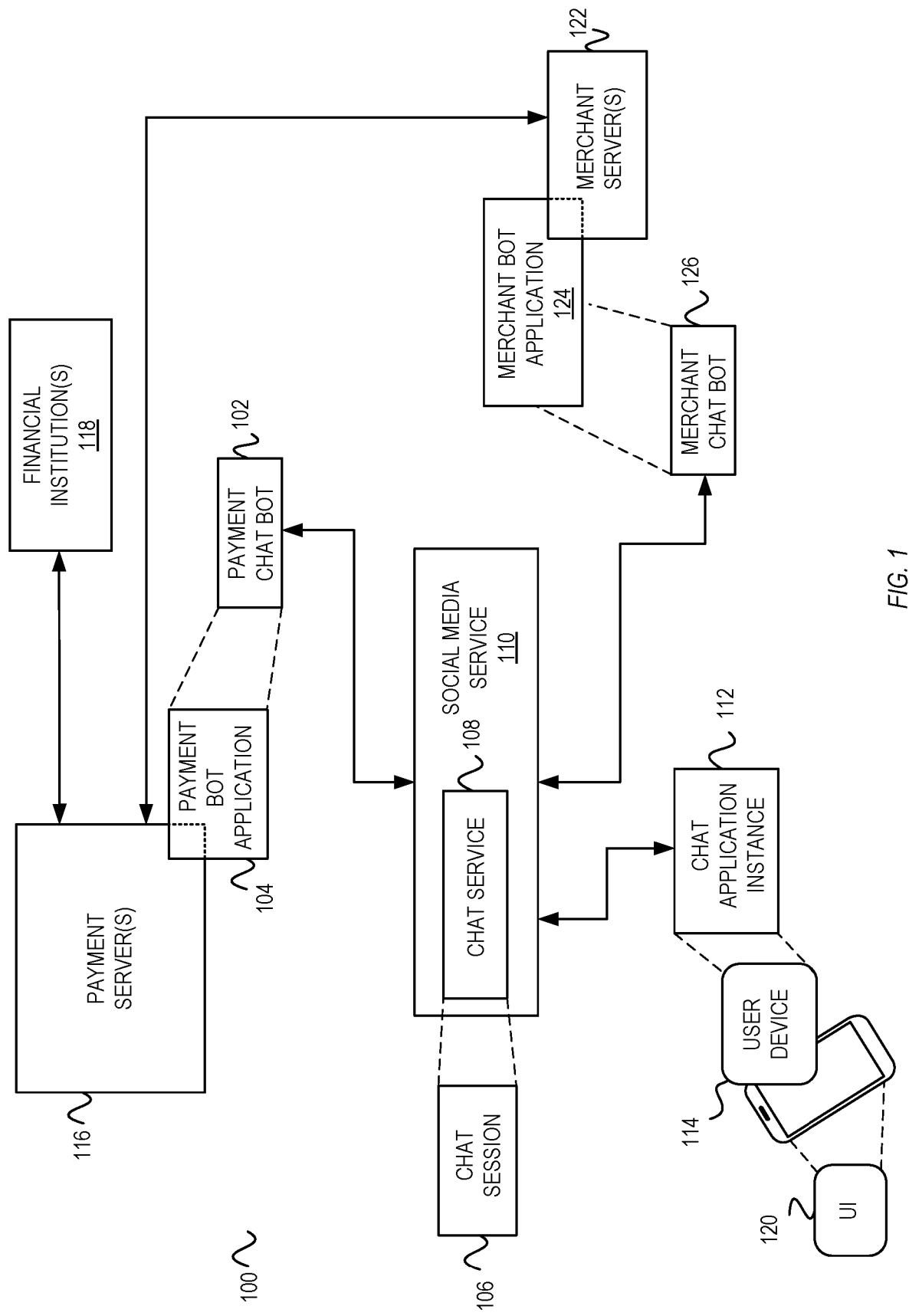
FIG. 1 is a system diagram illustrating embodiments of a communication system showing bot applications communicating using a chat session.

The description that follows includes exemplary systems, methods, techniques, instruction sequences and computer program products that embody techniques of the present inventive subject matter. However, it is understood that the described embodiments may be practiced without these specific details. For instance, although some examples refer to social media services, other types of media services are contemplated, such as an interactive comments of online news services.

Chat sessions facilitate communication between instances of chat applications running on various devices in a communication system. A user of one instance of a chat application can communicate, over the communication system, with a user of another instance of a chat application by transmitting and receiving communication to/from the chat session. For example, the communication system facilitates the transmission of chat texts, over a communication network, between the instances of the chat applications and the chat session. The chat session, which can be hosted by a chat service, can facilitate communication between the multiple instances of the chat applications. Each chat application, such as a SLACK chat application, or a FACEBOOK MESSENGER application, can be hosted by a user device. In some cases, the communication may be between multiple instances of the same type of chat application. In other cases, the communication may involve instances of multiple different types of chat applications. The user device can be any type of a personal device such as a mobile phone, tablet, or other computing device.

Thus, multiple SLACK chat application instances can communicate with each other by transmitting chat texts to, and receive chat texts from, a SLACK chat session. The chat service can be a part of a social media service. For example, the chat service can be a SLACK chat service that is a part of a SLACK team collaboration tool, or a FACEBOOK MESSEGENGER chat service that is a part of a FACEBOOK social networking service. The chat service itself can be further hosted by a server or another type of a computing device.

A bot application can communicate, via a chat bot, with the chat session and simulate a chat application instance for communicating with the other chat application instances. For example, the bot application may simulate a SLACK chat application instance for communicating, via a SLACK chat session, with other SLACK chat application instances. The chat bot can send and receive chat texts from the chat session.

The user may have access to a chat session via a chat application instance. The user may communicate, over the chat session, with a merchant chat bot that is hosted by a merchant server. The merchant chat bot facilitates communication about goods and/or services offered by the merchant. The merchant chat bot can provide information about these goods and/or services, as well as initiate a purchase transaction to purchase a certain good and/or service. The user can also communicate, over the chat session, with a payment chat bot that is hosted by a payment server. The payment chat bot facilitates communication about payment services offered by the payment server. The payment chat bot can provide access to user accounts at the payment server (e.g., if a certain user has an account at the payment server and/or if the chat session provides user authentication to the payment server).

For frictionless operation, the payment server can allow the user to initiate payment transactions from the environment of the chat session. Otherwise, the user would need to switch to another application (e.g., at a user device). However, the chat session may not have an association between the merchant and payment chat bots, or between merchant and payment servers. The user may also not have an account at the merchant server.

A method for facilitating communication between the payment and merchant chat bots includes determining, based on a chat text, whether to couple a payment session between a payment server and a merchant server. The payment chat bot can access the chat text that is provided in a chat session by a merchant chat bot. The chat session can be hosted by a chat service for communication between a plurality of chat application instances. Both the payment and merchant chat bots can simulate chat application instances. The payment chat bot can be hosted by a payment server, and the merchant chat bot can be hosted by a merchant server. The method includes, in response to a determination to couple the payment session, coupling the payment session between the payment server and the merchant server. The payment session is for processing a payment transaction initiated from a chat application instance via the chat session. The payment transaction is between an account of the user at the payment server and the merchant server.

The merchant server can determine that the chat text indicates a user's intent to use the payment server for a payment transaction with the merchant server. In some embodiments, the method can determine whether to couple the payment session between the payment server and the merchant server based on a session request from the merchant server. The session request can be transmitted, by the merchant server, to the payment server, responsive to the merchant bot accessing a chat text transmitted by the chat application instance (e.g., a chat text from the user). The following description, and associated Figures, illustrates various embodiments directed to the ideas listed above.

FIG. 1 is a system diagram 100 illustrating some embodiments of a communication system showing bot applications communicating using a chat session. In an overview of the system diagram 100, a payment chat bot 102 is hosted by a payment bot application 104. The bot application 104 communicates, via the payment chat bot 102, with a chat session 106. Similarly, a merchant chat bot 126 is hosted by a merchant bot application 124. The merchant bot application 124 communicates, via the merchant chat bot, with the chat session 106. The chat session 106 is hosted by a chat service 108, which in turn can be hosted by a social media service 110. Chat application instance 112 can communicate with other chat application instances (not shown) via the chat session 106. For example, the chat application instance 112 can transmit a chat text to the chat session 106, where this chat text can be accessed by other chat application instance (s).

The chat bots 102 and 126 can each simulate a respective chat application instance when communicating with the chat application instance 112. The chat application instance 112 may be hosted by a user device 114. The user device 114 can also display a user interface (UI) 120. The UI 120 can display visual elements, such as chat texts of the chat session 106. The UI 120 can also receive input from a user, such as a selection from a user. It is noted that the user device 114 can also receive input from a user via other input elements, such as via a keyboard, mouse, microphone (e.g., from a voice command), among others.

The bot application 104 can interface with a payment server 116 to provide instructions to the payment server 116 and receive financial information regarding users from the payment server 116. The payment server 116 can provide financial services, such as a fund transfer (e.g., a transfer of a certain monetary amount), to users. The payment server 116 can include payment accounts, each of which can be associated with a user. For example, a user of the user device 114 can be associated with a user payment account, and a merchant of the merchant server 122 can be associated with a merchant payment account at the payment server 116. The payment server 116 can facilitate the fund transfer from the user payment account to the merchant payment account, such as in response to instructions received from the payment bot application 104. The payment server 116 can be implemented by PAYPAL or another online payment system that allows users to send, accept, and request fund transfers.

In the example illustrated in FIG. 1, the payment server 116 interfaces with one or more financial institutions, such as financial institution(s) 118. Financial institutions 118 can provide financial services to users. Financial institutions 118 can be implemented as banks, credit unions, other deposit-taking institutions that accept and manage deposits and make loans, and other financial service providers. In some embodiments, financial institutions 118 can include credit card networks, e.g., for funding transfer of money between users. In some embodiments, financial institutions 118 may include a provider of purchasing power that is associated with a loyalty program.

In one embodiment, the payment bot application 104 can be implemented as a part of the payment server 116. The server can be implemented on a single computing device, or on multiple computing devices (e.g., using distributed computing devices or a cloud service). In another embodiment, the payment bot application 104 is separate from the payment server 116. The payment bot application 104 can instantiate the chat bot 102, as well as other chat bots. The payment bot application 104 can access, via the chat bot 102, chat texts that are provided to the chat session 106 by the chat application instance 112 and/or by the merchant bot application 124. The bot application 104 can determine, for example, whether any payment transactions are indicated by the chat text. Depending on the content of the chat text, the payment bot application 104 can transmit, via the payment chat bot 102, another chat text to the chat session 106 or communicate with the payment server 116. The payment bot application 104 can also initiate coupling of a payment session between the payment bot application 104 and the merchant bot application 124.

A service or an application (such as the bot application 104) can be hosted by a combination of software and hardware. It is noted that the same term "hosting" is used herein to describe both software hosting and hardware hosting. When software hosting, a software service such as the chat service 108, can instantiate and manage multiple chat sessions, such as the chat session 106 and other chat sessions. When hardware hosting, a computing device (such as a server or a user device) can provide resources such as memory, communication, and execution resources for execution of instructions.

In some implementations, the user associated with the chat application instance 112 does not have a direct way to access the payment server 116. For example, the user can only have access to the chat session 106 via the chat application instance 112. For frictionless operation, the payment server 116 allows the user to initiate payment transactions from the environment of the chat session 106 and via user interaction with the chat application instance 112. Otherwise, the user would need to switch to another application at the user device 114, which may lead to the user not completing the payment transaction (e.g., by cancelling an associated purchase that was initiated via the chat session with the merchant chat bot). Since the chat service 108 does not include user accounts at the payment server 116 or at the merchant server 122, the payment bot application 104 is configured to facilitate processing of the payment transactions by coupling a payment session between the payment bot application 104 and the merchant bot application 124 via the chat session 106 (i.e., via their respective chat bots 102 and 124).

The payment bot application 104 can access, via the payment chat bot 102, chat texts in the chat session 106. The chat text(s) can be provided to the chat session 106 from the chat application instance 112. The chat application instance 112 can be associated with a first chat account at the chat service 108. The first chat account can be identified by a user identification (user ID) at the chat service 108. The payment bot application 104 can access (via the payment chat bot 102) a chat text provided to the chat session 106 by the merchant bot application 124 (via the merchant chat bot 126). Based on the merchant-bot provided chat text, the payment bot application 104 can determine to couple a payment session between the payment server 116 and the merchant server.

The payment bot application 104 can access chat texts provided to the chat session 106 by the chat application instance 112. Based on the user-provided chat text(s), the payment bot application 104 can determine to couple the payment session. In some embodiments, the payment server 116 can receive a session request from the merchant server 122, where the session request is for the payment session.

In some embodiments, the payment server 116 can link the user's chat account at the chat service 108 with the user's payment account at the payment server 116. When a payment account is linked with a chat account, the payment bot application 104 includes an association between the chat account at the chat service 108 and the payment account at the payment server 116, for the same user. In some implementations, when a payment account is linked with a chat account, the bot application 104 can also access configuration information for the chat account at the chat service 108 and/or for the payment account at the payment server 116, for the same user.

Figure 2:
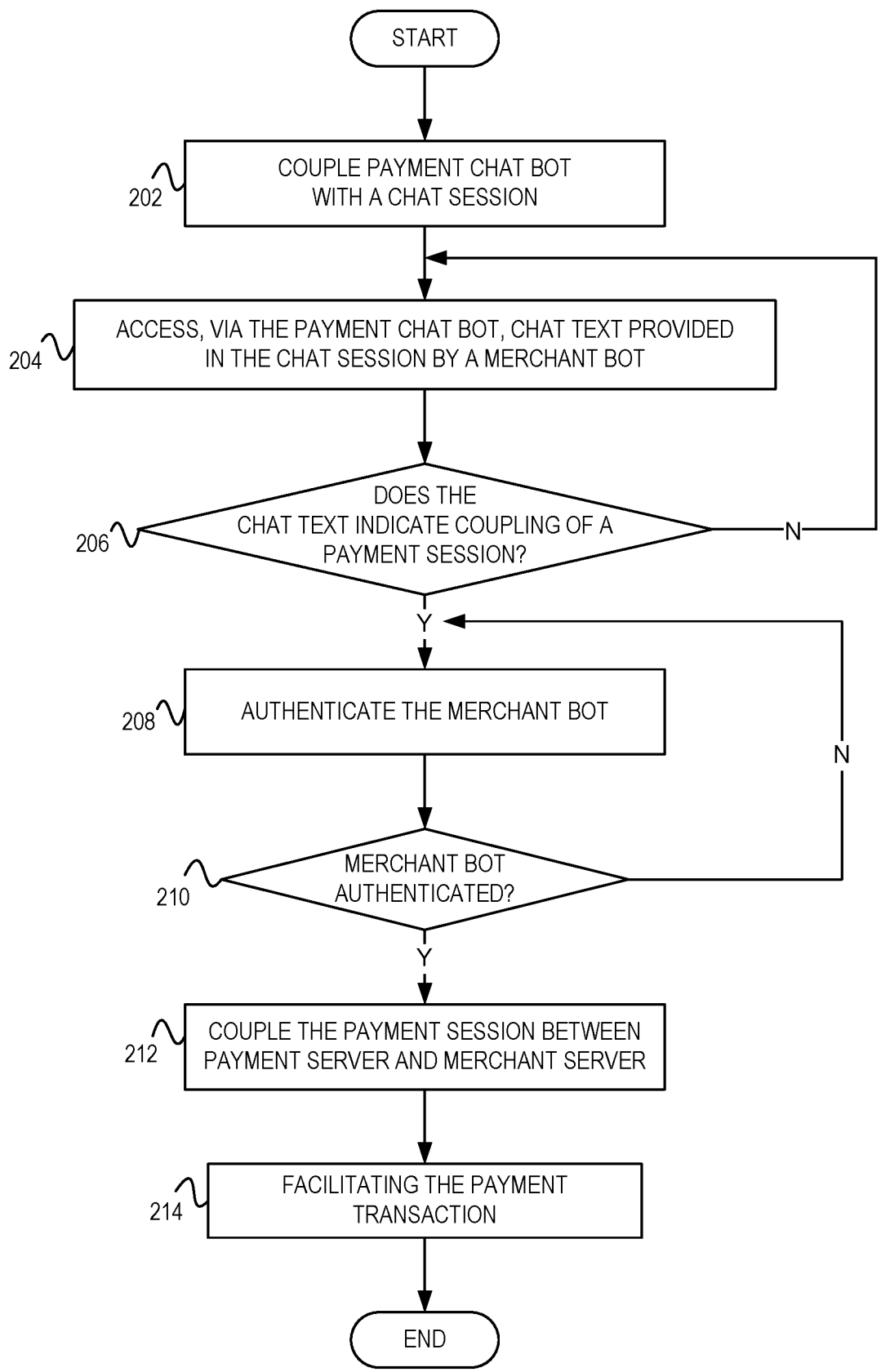
FIG. 2 is a flow diagram illustrating embodiments of operations for accessing chat session communication for transactions between chat bot applications.

FIG. 2 is a flow diagram illustrating embodiments of operations for accessing chat session communication for transactions between chat bot applications. The method of FIG. 2 is described with reference to the systems and components described in FIG. 1 (for illustration purposes and not as a limitation). The example operations can be carried out by the payment bot application 104 or by the payment server 116.

Beginning with 202, a payment chat bot is coupled with a chat session. With reference to FIG. 1, the payment chat bot 102 can be coupled with the chat session 106. In some cases, multiple payment chat bots can be coupled with multiple chat sessions. Coupling of a payment chat bot with a chat session can include registering with a chat session and configuring the payment chat bot for communication using the chat session. In some embodiments, the payment chat bot can access an initial chat text that is provided to the chat session from the chat application instance. The initial chat text can indicate a user's intent to purchase a product and/or service at a merchant.

In some embodiments, the payment bot application can be associated with multiple payment servers. Based on the initial chat text, the payment bot application can select a certain payment server from the multiple payment servers for processing a payment transaction associated with this purchase. For example, the payment bot application can access mappings (e.g., as stored at a database) and select a certain mapping that maps a certain payment server with the payment transaction. The mappings can associate a plurality of types of payment transaction to a plurality of payment servers. The mapping can be selected based on the merchant or type of the payment transaction indicated by the initial chat text.

In some embodiments, multiple payment chat bots can monitor the chat session. Based on the initial chat text, the multiple payment chat bots can initiate a payment server selection procedure for selecting a certain payment server. Each of the multiple payment chat bots can be associated with a payment bot application (which in turn is associated with a respective payment server). The payment bot applications can then initiate the payment server selection procedure that includes the payment bot applications communicating (e.g., via the chat session) to determine which payment server should be selected for the indicated payment transaction. Alternatively, the payment bot applications can communicate using other communication channels, without using the chat session, or by using a separate chat session that is initiated for the payment server selection procedure.

At 204, the payment bot application accesses, via the payment chat bot, a chat text provided in the chat session. With reference to FIG. 1, the payment bot application 104 can access, via the payment chat bot 102, a chat text (also referred to as a merchant chat text) provided in the chat session 106 by the merchant bot application 124 (via the merchant chat bot 126). In one embodiment, the merchant chat text is accessible (e.g., readable) by the payment chat bot 102 but not by the chat application instance 112. In some embodiments, the merchant chat text is accessible by both the payment chat bot 102 and the chat application instance 112. The merchant bot application 124 can generate the merchant chat text to facilitate processing of the payment transaction between the merchant server 122 and a user associated with the chat application instance 112. Thus, the merchant text is one of chat texts between the chat bots for communicating of requests and/or instructions between of the payment and merchant servers.

In some embodiments, at 204, the payment server selection procedure can be reactivated to select, based on the merchant chat text, another payment server and/or another payment bot application. For example, a first payment server that was selected at 202 during the payment server selection procedure can be switched a second payment sever if the merchant chat text indicates use of the second payment server. In some embodiments, instead of the merchant chat text, the merchant server can transmit, to the payment server, a session request that requests coupling of the payment session.

At 206, the payment bot application determines whether the merchant chat text indicates coupling of the payment session. For example, the payment bot application 104 can determine that the chat text indicates coupling of a payment session between the merchant server 122 and the payment server 116. The payment bot application can determine whether to couple the payment session by determining that the initial chat text indicates the payment transaction between a user account associated with the first chat account and the merchant server. For example, the merchant text can include a request or instructions, such as illustrated at 340. Alternatively, the payment bot application can determine to couple the payment session based on the session request.

In some embodiments, at 206 the payment bot application can access the chat service to determine a user ID, at the chat service, of a user of the first application instance. In some embodiments, the payment bot application can transmit, via the payment chat bot, another chat text to the chat session for obtaining a user identification (ID), at the chat service, of the user of the first application instance. The payment bot application can determine, based on the user ID, a correlation between the first application instance at the chat service and the payment service. The payment bot application can then update, e.g., based on a response from the chat service, a database to change the correlation between the user ID at the chat application instance and a payment account at the payment server.

In some embodiments, the payment bot application can determine whether to couple the payment server with the merchant server by determining whether a transaction amount of payment transaction is acceptable based on a transaction threshold of the user account. The payment bot application can use the user ID to determine a user payment account (that is associated with the user) at the payment server. The payment bot application can then couple, at 212 and using the user payment account, the payment session between the merchant and payment servers.

At 208, the payment bot application authenticates the merchant bot. The authentication can include the payment bot application communicating with the chat application instance (i.e., using the payment chat bot 102) via the chat session 106 to receive confirmation from the chat application instance of the payment transaction and/or the merchant bot application. The authentication can include the payment bot application 104 transmitting a link to the chat session. The link (e.g., as shown at 409) can be used to access an authentication web page (e.g., at the payment server) for the user for the authentication. In some embodiments, the chat bot application can determine, based on the payment transaction, whether to use another chat session (e.g. hosted by the same or another chat service) for authentication, by a user of the chat application instance, of the payment transaction.

At 210, the bot application determines whether the merchant bot is authenticated. If merchant bot is authenticated, the flow proceeds to 212. If the merchant bot is not authenticated, the flow proceeds back to 208. Typically, the payment server authenticates the merchant bot for the payment transaction prior to the coupling of the payment session at 210. However, in some implementations, if the payment server determines a trustworthiness score of the merchant that is higher than a predetermined threshold, the payment server can authenticate the merchant bot substantially in parallel with coupling of the payment session. In some embodiments, if the trustworthiness score of the merchant that is higher than another predetermined threshold, the payment server doesn't authenticate the merchant bot, i.e., the steps 208 and 210 are skipped, and step 212 is performed after step 206.

At 212, the payment bot application 104 couples the payment session between the payment server and the merchant server. The coupling can include associating the user ID of the user of the chat application instance with a user account at the payment server and with another user account reference at the merchant server. The coupling can include authorization of a fund transfer for the payment transaction between the user's payment account to the merchant server.

At 214, the payment bot application facilitates the payment transaction. At 214, the payment bot application can determine to perform a fund transfer from a payment account at the payment server to a merchant payment account at the payment server. The fund transfer can be determined based on the payment transaction.

Figure 3:
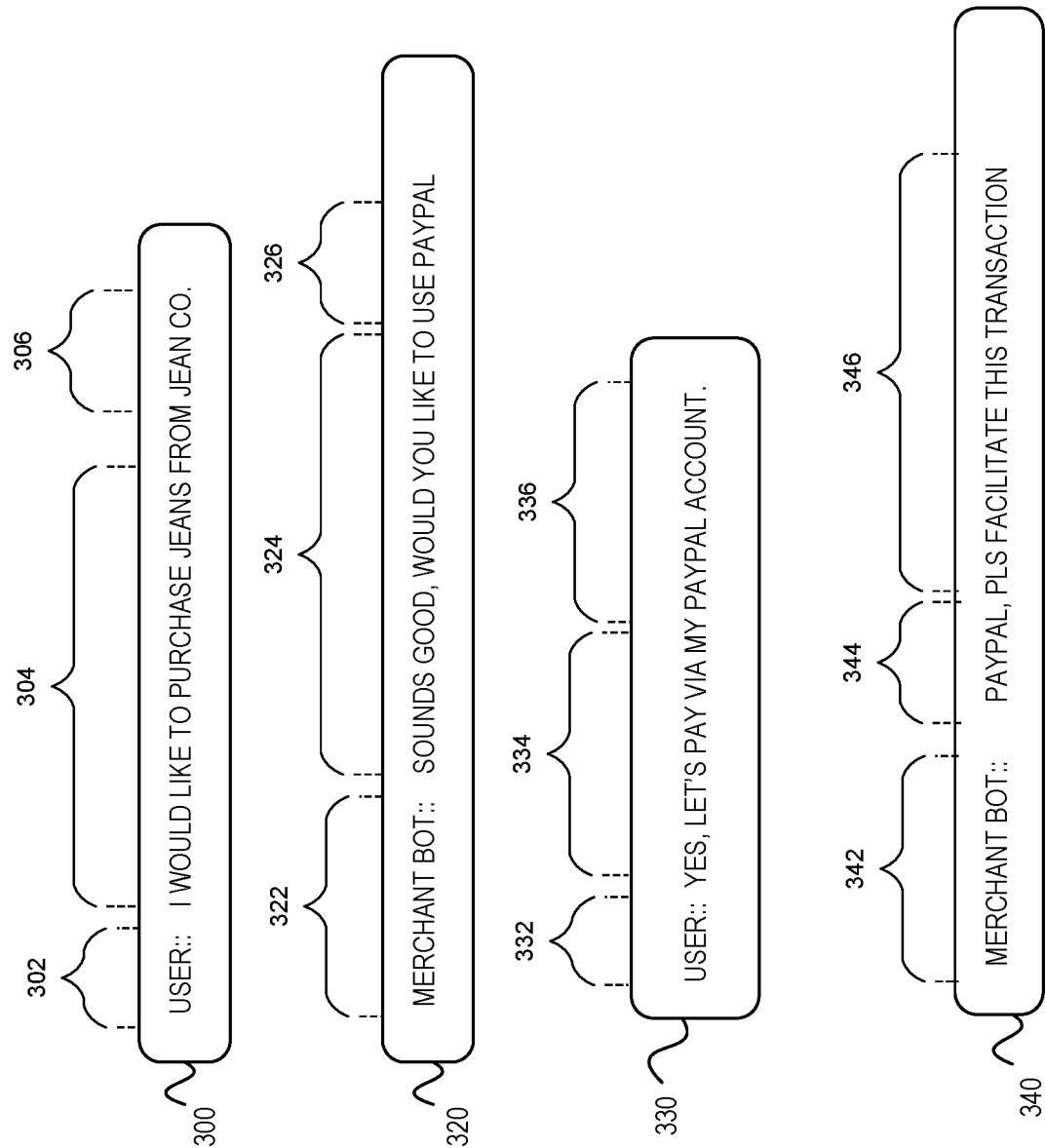
FIGS. 3 and 4 illustrate embodiments of communication for accessing chat session communication for transactions between chat bot applications.
Figure 4:
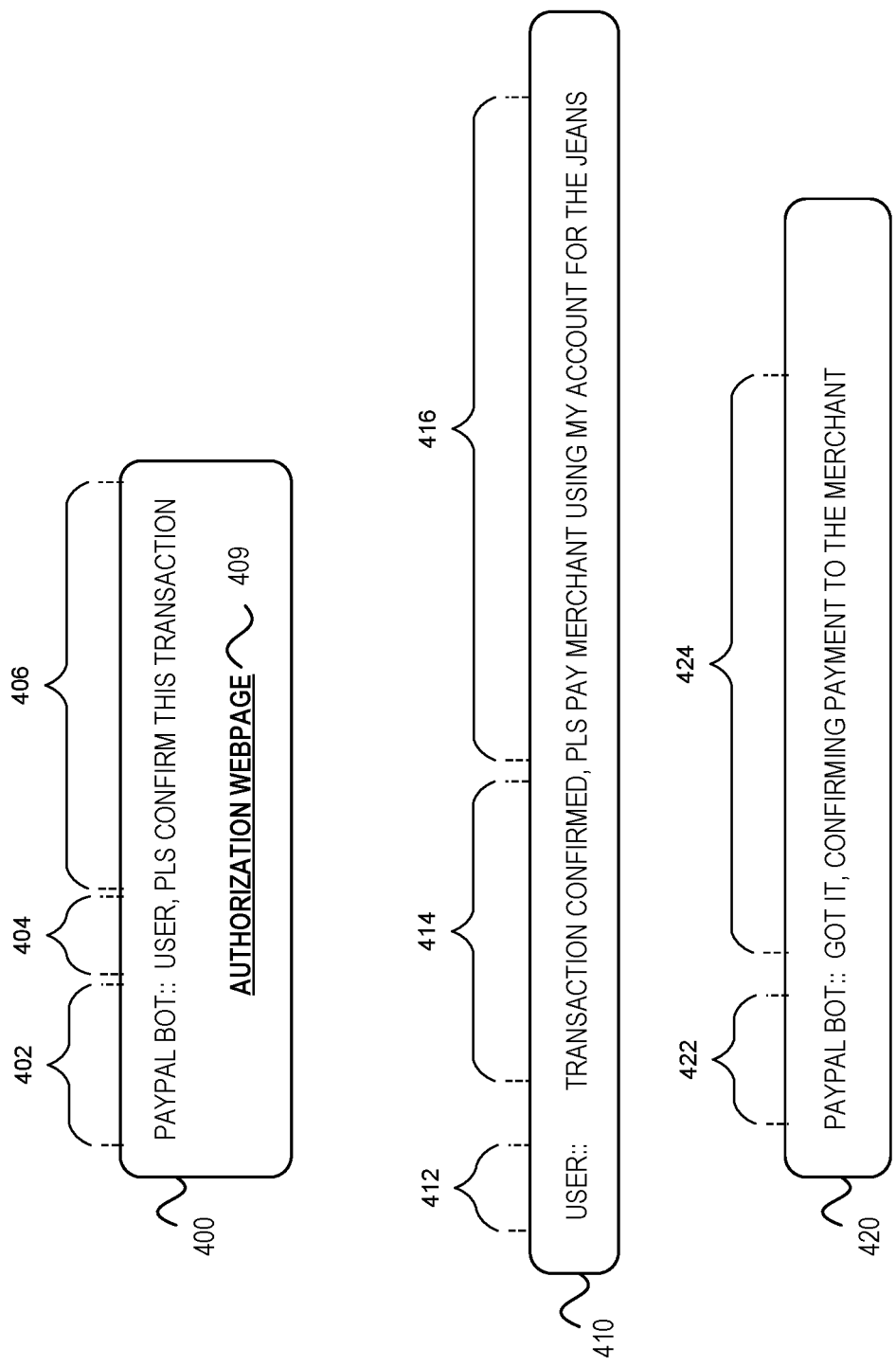

FIGS. 3 and 4 illustrate embodiments of communication for accessing chat session communication for transactions between chat bot applications. Chat text 300 illustrates a chat text that can be provided, by the chat application instance 112, to the chat session 106. The chat text 300 can be accessed, via the merchant chat bot 126 of the merchant bot application 124, from the chat session 106. The chat text 300 can include chat text portions (also referred to as "portions") 302-306. The merchant bot application 124 can receive, via the merchant chat bot 126, the chat text 300 and parse the various portions 302-306, such as to determine whether the chat text 300 indicates intent to purchase merchandise. The portion 302 of "user:" indicates that the chat application instance 112 is transmitting the chat text 300. The portion 304 of "I would like to purchase jeans" indicates intent by a user of the chat application instance 112 to purchase certain merchandise. At 306, the chat text 300 can also indicate that the merchandise is to be purchased from "Jean Co" merchant (e.g., the merchant associated with the merchant server 122).

The chat text 320 can include portions 322-326. The merchant bot application 124 can transmit, via the merchant chat bot 126, the chat text 320 to the chat session 106. In the depicted example embodiment, the portion 322 of "merchant bot:" indicates that the merchant chat bot 126 is transmitting the chat text 320. The portion 324 of "sounds good, would you like to use" is generated by the merchant bot application 124 to indicate that a payment server is indicated at the portion 326.

The chat text 330 can include portions 332-336. The portion 332 of "user:" indicates that the chat application instance 112 is transmitting the chat text 330. The portion 334 of "Yes, let's pay via" indicates intent by a user of the chat application instance 112 to use a certain payment server. At 336, the chat text 330 can indicate that the user would like to use that user's payment account (i.e., "my PayPal account") at the payment server 116.

The chat text 340 can include portions 342-346. In the depicted example embodiment, the portion 342 of "merchant bot:" indicates that the merchant chat bot 126 is transmitting the chat text 340. The portion 344 of "PayPal" indicates that the payment chat bot is the intended recipient of the chat text 340. The portion of 346 of "pls facilitate this transaction" is generated by the merchant bot application 124 to communicate to the payment bot application a request for the payment session.

At FIG. 4, a chat text 400 illustrates a chat text that can be provided by the payment bot application 104, via the payment chat bot 102, to the chat session 106. The chat text 400 can include chat text portions 402-406. The portion 402 of "paypal bot:" indicates that the payment chat bot 106 is transmitting the chat text 400. The portion 404 of "user" indicates that the chat text 400 is addressed to the user of the chat application instance 112. The portion 406 of "please confirm this transaction" indicates to the user to confirm the transaction.

In some embodiments, the payment bot application can also provide, via the chat text 400, a link 409 to an authorization webpage. The authorization webpage can be a webpage that is provided by the payment server 116 that facilitates authorization of using the user's account at the payment server 116 for the payment transaction with the merchant server 122. In some embodiments, the link 409 can be provided, by the payment server 116, to the user device 114 without using the chat session 106. In some embodiments, the chat text 400 can cause a user interface (e.g., UI 120) of the user device 114 to present a linking login for linking the chat account (at the chat service) with a payment account at the payment server 116.

The chat text 410 can include portions 412-416. The portion 412 of "user:" indicates that the chat application instance 112 is transmitting the chat text 410. The portion 414 of "Transaction confirmed" indicates intent by a user of the chat application instance 112 to use a certain payment server. At 416, the chat text 410 can indicate that the user would like to use that user's payment account (i.e., "my account") at the payment server 116.

The chat text 420 illustrates a chat text that can be provided by the payment bot application 104, via the payment chat bot 102, to the chat session 106. The chat text 420 can include chat text portions 422-424. The portion 422 of "paypal bot:" indicates that the payment chat bot 106 is transmitting the chat text 400. The portion 424 confirms that the payment transaction has been properly processed by the payment server 116.

Figure 5:
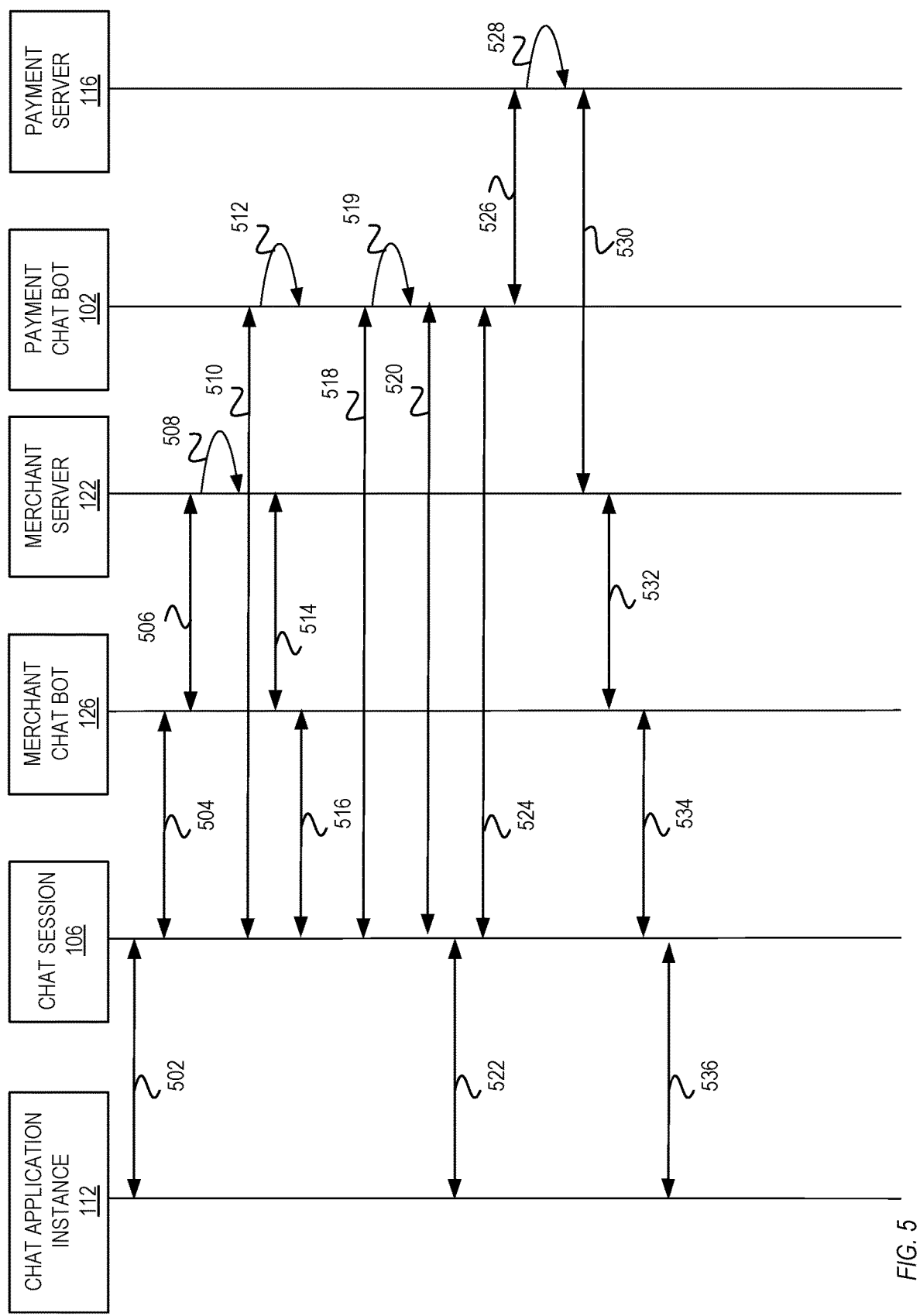
FIG. 5 is a timing diagram illustrating one embodiment of accessing chat session communication for transactions between chat bot applications.

FIG. 5 is a timing diagram illustrating one embodiment of accessing chat session communication for transactions between chat bot applications. As shown by FIG. 5, a chat application instance 112, the merchant bot, and the payment bot communicate with each other using a chat session 106. The communications of FIG. 5 can be performed over one or more communication networks. Portions of the timing diagram of FIG. 5 correspond to the flow diagrams of FIG. 2 and of the communication shown in FIGS. 3 and 4. It is noted that not all of the communication between a merchant system 122 and the merchant chat bot 126; and/or between the payment system 116 and the payment chat bot 102 are shown. Furthermore, some of the communication shown is optional.

At 502, the chat application instance 112 can access the chat text at the chat session 106. At 504, the merchant chat bot 126 can provide a chat text to the chat session 106. At 506, the merchant server 122 can communicate with the merchant chat bot 126, such as to receive the accessed chat text. At 508, the merchant server 122 can determine that the user of the chat application instance 112 indicates a purchase intent. The chat text 300 of FIG. 300 is one example of the chat text provided and accessed at 502-508.

At 514, the merchant 122 can communicate with the merchant chat bot 126, such as to instruct the merchant chat bot 126 to access the chat session 106. At 516, the merchant chat bot 126 can access the chat session 106, such as to communicate with the payment chat bot 102. The communication (e.g., as shown at text 340) provided by the merchant chat bot 126 can be for establishing the payment session. The payment chat bot 102 can access this communication at 518. At 519, the payment chat bot 102 can determine that the chat text indicates coupling of the payment session. As discussed above, the payment chat bot 102 and/or the payment system 116 can also determine whether to couple the payment session based on the session request received outside of the chat session 106 from the merchant server 122. The session request can be transmitted, for example, by the merchant server 122 to the payment server 116. The session request can indicate a user's intent to use the payment server 116 for the payment transaction with the merchant server 122. The session request can indicate an intent that the payment chat bot 102 be used to facilitate the payment transaction with the merchant chat bot 126.

At 520, the payment chat bot 102 can communicate with the chat application instance 112 by sending a chat text to the chat session 106 for confirming the payment transaction. The chat text 400 is an example of the communication at 520. At 522, the chat application instance can also provide confirmation of the payment transaction, e.g., as shown at the chat text 410. Alternatively, the user device 114 can transmit authorization to the payment server 116 without using the chat session 106. For example, the chat text 400 can include a link 409 that allows the confirmation to be made by the user device 114 by accessing a web page provided by the payment server 116. At 524, the chat payment bot 102 can access the chat session 106, e.g., to access the confirmation of the payment transaction.

At 526, the payment chat bot can communicate with the payment system 116 to facilitate the payment transaction. At 528, the payment system 116 can process the payment transaction. At 530 the payment system 116 can provide confirmation to the merchant system 122 that the payment transaction has been successfully processed. Alternatively, the payment chat bot 102 can provide the payment transaction confirmation (e.g., based on communication with the payment system 116) to the chat session 106 for access by the merchant chat bot 126. At 532, the merchant chat bot 126 can communicate with the merchant system 122 to provide the payment transaction confirmation. At 534, the merchant chat bot can provide the payment transaction confirmation to the chat session 106, which can be then accessed by the chat application instance 112 at 536.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 2-5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
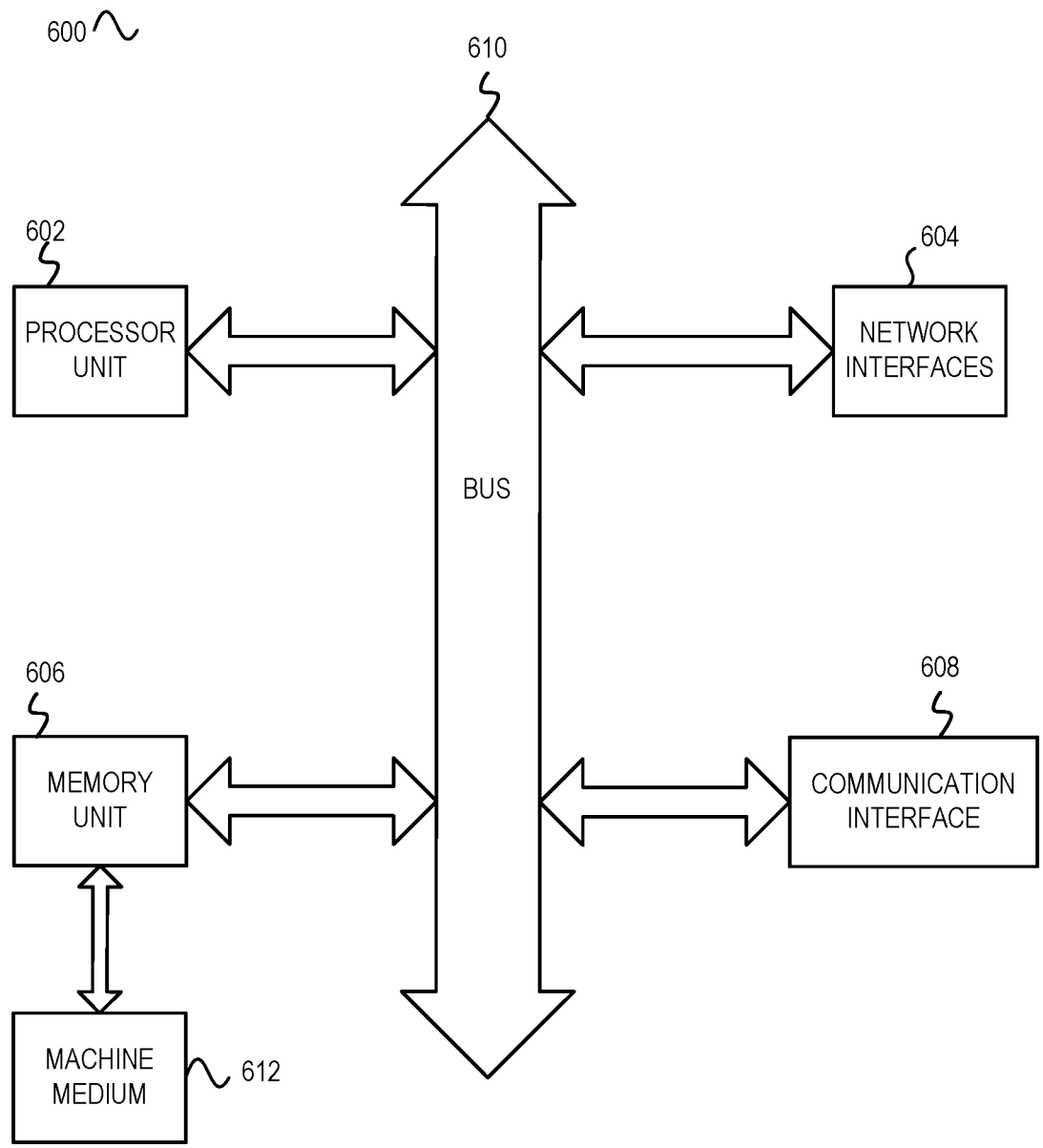
FIG. 6 is a block diagram of one embodiment of an electronic device used in the communication system of FIGS. 1 and 5.

FIG. 6 is a block diagram of an exemplary embodiment of an electronic device 600 including a communication interface 608 for network communications. The electronic device can embody functionality to implement embodiments described in FIGS. 1-5 above. In some implementations, the electronic device 600 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include the bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that facilitate communicating in chat sessions using chat bots for chat session communication for transactions between chat bot applications. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interface 604 and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for using chat bots as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for communicating in chat sessions using chat bots to access payment accounts, the method comprising:

detecting that a chat session is initiated between a user chat application instance, associated with a user, and a merchant chat bot simulating one of a plurality of chat application instances that enables the merchant chat bot to communicate with the user chat application instance via the chat session;

instantiating a payment chat bot for simulating another one of the plurality of chat application instances to enable the payment chat bot to communicate within the chat session with the user chat application instance and the chat application instance simulated by the merchant chat bot;

accessing, by the payment chat bot, a first chat text provided in the chat session by the merchant chat bot and directed to the payment chat bot, the chat session hosted by a chat service to facilitate communication between the plurality of chat application instances;

determining, based on the first chat text, whether to couple a payment session between a payment server that controls the payment chat bot and a merchant server that controls the merchant chat bot, the payment session for processing a payment transaction initiated by the user from the user chat application instance via the chat session;

in response to a determination to couple the payment session, coupling the payment session for processing the payment transaction between the payment server and the merchant server;

causing a user interface to display within the chat session that allows the user to authorize the payment transaction;

accessing, by the payment chat bot, a second chat text provided in the chat session by the user chat application instance and directed to the payment chat bot;

determining, based on the second chat text, that the user has confirmed to have the payment transaction proceed with payment to a merchant associated with the merchant chat bot; and in response to the determining that the user has confirmed to have the payment transaction proceed, processing the payment transaction between the payment server and the merchant server.

2. The method of claim 1, wherein said determining whether to couple the payment session comprises:

selecting the payment server from a plurality of payment servers for processing the payment transaction, wherein the selecting is based, at least in part, on analysis of the first chat text.

3. The method of claim 1, wherein said determining whether to couple the payment session comprises determining that a previous chat text in the chat session comprises an indication of the payment transaction between a user account associated with the user chat application instance and the merchant server.

4. The method of claim 1, further comprising:

determining to link a user chat account of the user chat application instance with one of a plurality of payment servers; and selecting the payment server from the plurality of payment servers, wherein the user interface includes a linking login for linking the user chat account with a payment account at the payment server.

5. The method of claim 1, wherein the processing the payment transaction between the payment server and the merchant server comprises transferring a monetary amount from a payment account at the payment server to a merchant payment account at with the payment server.

6. The method of claim 1, further comprising authenticating the merchant chat bot for the payment transaction prior to the coupling of the payment session.

7. The method of claim 1, further comprising:

transmitting, via the payment chat bot, a third chat text to the chat session, the third chat text for obtaining a user identification (ID), at the chat service, of the user of the user chat application instance; and determining, based on the user ID, a correlation between the user chat application instance at the chat service and a payment account at the payment server.

8. The method of claim 1, further comprising:

determining, based on the payment transaction, whether to use another chat session hosted by another chat service for authorization, by the user of the user chat application instance, of the payment transaction.

9. The method of claim 1, further comprising:

accessing the chat service to determine a user ID, at the chat service, of the user of the user chat application instance; and updating, based on a response from the chat service, a database to change a correlation between the user ID of the user of the user chat application instance and a payment account at the payment server.

10. The method of claim 1, wherein said determining whether to couple the payment server and the merchant server comprises:

associating a user ID of the user with a user account at the payment server; and determining whether a transaction amount of the payment transaction is acceptable based on a transaction threshold of the user account.

11. The method of claim 1, wherein said coupling comprises:

associating a user ID of the user with a user account at the payment server and with another user account reference at the merchant server.

12. A system comprising:

a non-transitory memory storing instructions; and a processor configured to execute the instructions to cause the system to:

detect that a chat session is initiated between a user chat application instance, associated with a user, and a merchant chat bot simulating one of a plurality of chat application instances that enables the merchant chat bot to communicate with the user chat application instance via the chat session;

instantiate a payment chat bot for simulating another one of the plurality of chat application instances to enable the payment chat bot to communicate within the chat session with the user chat application instance and the chat application instance simulated by the merchant chat bot;

access, by the payment chat bot, a first chat text provided in the chat session by the merchant chat bot and directed to the payment chat bot, the chat session hosted by a chat service to facilitate communication between the plurality of chat application instances, the payment chat bot simulating one of the plurality of chat application instances;

determine, based on the first chat text, whether to couple a payment session between a payment server that controls the payment chat bot and a merchant server that controls the merchant chat bot, the payment session for processing a payment transaction initiated from the user chat application instance via the chat session;

in response to a determination to couple the payment session, couple the payment session for processing the payment transaction between the payment server and the merchant server;

cause a user interface to display within the chat session that allows the user to authorize the payment transaction;

access, by the payment chat bot, a second chat text provided in the chat session by the user chat application instance and directed to the payment chat bot;

determine, based on the second chat text provided in the chat session, that the user has confirmed to have the payment transaction proceed for payment to a merchant associated with the merchant chat bot; and in response to the determining that the user has confirmed to have the payment transaction proceed, process the payment transaction between the payment server and the merchant server.

13. The system of claim 12, wherein said determining whether to couple the payment session comprises:

selecting the payment server from a plurality of payment servers for processing the payment transaction, wherein the selecting is based, at least in part, on analysis of the first chat text.

14. The system of claim 12, wherein executing the instructions further causes the system to, determine to link a chat account of the user chat application instance with one of a plurality of payment servers; and select the payment server from the plurality of payment servers wherein the user interface includes a linking login for linking the chat account with a payment account at the payment server.

15. The system of claim 12, wherein executing the instructions further causes the system to:

transmit, via the payment chat bot, a third chat text to the chat session, the third chat text for obtaining a user identification (ID), at the chat service, of the user of the user chat application instance; and determine, based on the user ID, a correlation between the user chat application instance at the chat service and a payment account at the payment server.

16. The system of claim 12, wherein executing the instructions further causes the system to:

access the chat service to determine a user ID, at the chat service, of a user of the user chat application instance; and update, based on a response from the chat service, a database to change a correlation between the user ID at the user chat application instance and a payment account at the payment server.

17. A non-transitory machine-readable medium having instructions stored thereon, the instructions executable to cause performance of operations comprising:

detecting that a chat session is initiated between a user chat application instance, associated with a user, and a merchant chat bot simulating one of a plurality of chat application instances that enables the merchant chat bot to communicate with the user chat application instance via the chat session;

instantiating a payment chat bot for simulating another one of the plurality of chat application instances to enable the payment chat bot to communicate within the chat session with the user chat application instance and the chat application instance simulated by the merchant chat bot;

accessing, by the payment chat bot, a first chat text provided in the chat session by the merchant chat bot and directed to the payment chat bot, the chat session hosted by a chat service to facilitate communication between the plurality of chat application instances;

determining, based on the first chat text, whether to couple a payment session between a payment server that controls the payment chat bot and a merchant server that controls the merchant chat bot, the payment session for processing a payment transaction initiated from the user chat application instance via the chat session;

in response to a determination to couple the payment session, coupling the payment session for processing the payment transaction between the payment server and the merchant server;

causing a user interface to display within the chat session that allows the user to authorize the payment transaction;

accessing, by the payment chat bot, a second chat text provided in the chat session by the user chat application instance and directed to the payment chat bot;

determining, based on the second chat text, that the user has confirmed to have the payment transaction proceed for payment to a merchant associated with the merchant chat bot; and in response to the determining that the user has confirmed to have the payment transaction proceed, processing the payment transaction between the payment server and the merchant.

18. The non-transitory machine-readable medium of claim 17, wherein the operations further comprise:

determining to link a chat account of the user chat application instance with one of a plurality of payment servers; and selecting the payment server from the plurality of payment servers, wherein the user interface includes a linking login for linking the chat account with a payment account at the payment server.

19. The non-transitory machine-readable medium of claim 18, wherein the operations further comprise:

transmitting, via the payment chat bot, a third chat text to the chat session, the third chat text for obtaining a user identification (ID), at the chat service, of the user of the user chat application instance; and determining, based on the user ID, a correlation between the user chat application instance at the chat service and the payment account at the payment server.

20. The non-transitory machine-readable medium of claim 18, wherein the operations further comprise:

accessing the chat service to determine a user ID, at the chat service, of the user of the user chat application instance; and updating, based on a response from the chat service, a database to change a correlation between the user ID of the user of the user chat application instance and the payment account at the payment server.

* * * * *